United States Patent [19]

Linn et al.

[11] 3,729,327

[45] Apr. 24, 1973

[54] APPARATUS FOR AGGLOMERATION

[75] Inventors: Stephen Linn, Tenafly, Robert F. Bardsley, Harrington Park both of N.J.

[73] Assignee: General Foods Corporation, White Plains, N.Y.

[22] Filed: Feb. 25, 1971

[21] Appl. No.: 118,738

[52] U.S. Cl. ..........99/467, 99/71

[51] Int. Cl. ..........A23f 1/08

[58] Field of Search ..........99/234 R, 71, 72, 99/73, 467; 23/313

[56] References Cited

UNITED STATES PATENTS

| | | | |
|---|---|---|---|
| 3,554,760 | 1/1971 | Sienkiewicz | 99/71 |
| 3,143,428 | 8/1964 | Reimers | 23/313 |

*Primary Examiner*—Robert W. Jenkins

*Attorney*—Howard J. Newby et al.

[57] ABSTRACT

An improved apparatus for agglomerating pulverant materials such as soluble coffee powder wherein the particles to be agglomerated are distributed and positioned for wetting and impaction in a gaseous atmosphere by means of a vertically vibrating distributor plate having a plurality of apertures in a horizontal surface. The apparatus is designed and operated to expose the powdered material to the gaseous atmosphere in the form of spatially interrupted parallel streams of falling individual particles or colligations of particles whereby each stream has a substantially rectilinear geometry prior to being intercepted by jets of vapor, such as saturated steam, which disrupt the formation of particles or colligations of particles to the extent they are wetted, randomly impacted to agglomerate form, and concomitantly redirected into a tempering and drying zone.

9 Claims, 12 Drawing Figures

Patented April 24, 1973

INVENTORS
Stephen Linn
BY Robert F. Brodsley
Howard ...
AGENT

Patented April 24, 1973 3,729,327

INVENTORS
Stephen Linn
BY Robert F. Bardsley
Howard Newby
AGENT

INVENTORS
Stephen Linn
BY Robert F. Bardsley
Howard Newby
AGENT

INVENTORS
Stephen Linn
BY Robert F. Bardsley

Howard Newby
AGENT

INVENTORS
Stephen Linn
BY Robert F. Bradley

Howard Newby
AGENT

INVENTORS
Stephen Linn
BY Robert F. Bradley
Howard Newby
AGENT

| Coordinate | Amplitude |
|---|---|
| X | 0.004" – 0.009" |
| Y | 0.004" – 0.009" |
| Z | 0.025" – 0.060" |

INVENTORS
Stephen Linn
BY Robert F. Bardsley

Howard Murphy
AGENT

APPARATUS FOR AGGLOMERATION

BACKGROUND OF THE INVENTION

1. Field of the Invention

This invention relates, in general, to the art of agglomeration and, in particular, is directed to an improved apparatus for effecting vapor-solid contact which assures consistent, satisfactory agglomeration of small solid particles. More specifically, the invention is concerned with an improved process and apparatus for agglomerating soluble coffee particles to produce agglomerates of desired density, size and appearance at economically attractive and consistent production rates.

2. Description of the Prior Art

Within the recent past, size enlargement or agglomeration of powdered materials to enhance their appearance and performance has attained considerable importance and impetus — especially in the art of food processing.

Sienkiewicz, et al in U.S. Pat. No. 2,977,203 disclose an advance in the art of vapor-solid contact for agglomeration purposes. In this patent, an agglomeration procedure is described in which particles are suitably arranged in a substantially planar distribution and are caused to move in the form of a falling "curtain" of particles which is intercepted by a jet of steam projected in substantially the same plane as the particles and directed at an angle substantially normal to the direction and travel of the curtain of particles. The particles are wetted by the steam and redirected in the form of a single stream which substantially coincides with the path of the jet of steam and the particles are more or less concentrated with respect to the flow of the steam jet for an extended period of time as the particles travel therealong. Thus, the wetted particles are provided prolonged opportunity for contact and collision which assures a high degree of agglomeration.

The aforementioned basic concept of vapor-solid contact has been extended by Sienkiewicz, et al to include a plurality of curtains or streams of powdered material being intercepted by two jets of steam, one jet of steam above the other. As described in their !U.S. Pat. No. 3,554,760, the powdered material (soluble coffee particles) falling in vertical, parallel curtains of material into a steam zone is disrupted into wet agglomerates which are redirected in a substantially horizontal direction into a drying zone by having upper and lower jets of steam positioned in the steaming zone at a substantial angle to the falling curtains of powder. The function of the upper steam jet or jets is that of disrupting the falling curtains of powder and to wet the agglomerates while the function of the lower jet or jets of steam involves making the wet agglomerates more uniform in size, density, and moisture content and also assures conveyance of the agglomerates into the drying zOne.

The above described methods of contacting particles with steam to form agglomerates has been demonstrated in test runs of short duration which produced agglomerates of soluble coffee powder superior in many physical characteristics to those produced by methods previously knowledgeable to the art. However, projection of the techniques disclosed in the aforementioned patents to a sustaining workable commercial scale was not completely successful primarily because of deficiencies in the apparatus design and construction. These deficiencies resulted in the inability to control the operation on a sustained basis and the inability to obtain agglomerates at the desired rate which had the required uniformity of density, color, size, and moisture content.

Heretofore, attempts to overcome the problems of "out-of-specification" agglomerate products and low and erratic production rates resulting from the equipment and processing deficiencies have been unsuccessful. In fact, the expediencies proposed for correcting the source of the difficulties have given rise to other, and perhaps more serious, problems.

In spite of the severe limitations imposed on the processes for the successful agglomeration of pulverant materials, some food products, especially soluble coffee in agglomerated form, offer the consumer such profound advantages of convenience of preparation, there exists a major incentive to improve upon these articles of commerce. The apparatus, and the method of operating the apparatus of this invention, has effected significant improvements over the above referred to processes in a novel and unique manner which has led to the successful economical production of agglomerated soluble coffee on a commercial scale. Additionally, the apparatus of the instant invention, because of its versatility of operation under controlled conditions, is adaptable to, and has good potential for agglomerating a wide variety of powder materials.

OBJECT OF the INVENTION

The instant invention constitutes improvements upon prior art agglomeration apparatus and processing methods and has the overall object of providing agglomerated products within controllable physical specifications at sustained, commercially economical production rates.

It is another object of this invention to provide vapor-solid contact agglomeration apparatus of adequate structural strength and of novel design and operating principle to produce agglomerates of particles with physical characteristics superior to those heretofore obtainable.

It is another object of the invention to provide vapor-solid contact agglomeration apparatus, which by its unique design, distributes the powdered material to be agglomerated to the vapor zone therein in a novel and effective pattern by the vibrating motion of a distributor plate and said apparatus incorporates structural features which preclude unwanted modulations of vibratory motion and metal fatigue structural damage over prolonged periods of operation.

It is still another object of this invention to provide agglomerates of varying size, structure, density, and moisture content within controllable limits.

It is a further object of this invention to provide agglomeration apparatus and a method of agglomeration which produces a very high yield of agglomerates such that classification of the agglomerated product and recycling of unagglomerated particles can be minimized.

A still further object of the invention is to provide agglomeration apparatus and an agglomeration process which minimizes flavor degradation of heat labile particles during the agglomeration process.

Yet another object of the invention is to provide agglomeration apparatus and a process for agglomeration which yield agglomerates characterized by having strong, thick bonds of fused solid material holding the particles together in the form of an agglomerate.

It is a feature of the present invention that the agglomeration apparatus and process of agglomeration pertaining thereto is particularly adaptable to the agglomeration of soluble coffee powder and, in addition to providing agglomerated soluble coffee products which satisfy the above objects, the invention also provides a method of producing agglomerated soluble coffee products having a wide range of physical characteristics covering the ambit from a light-colored granular agglomerate to a dark colored fluffy-type agglomerate.

Further, and additional objects, features and advantages of the agglomeration apparatus and its operation incident to the invention will become manifest and will appear in the detailed description hereinafter provided.

SUMMARY OF THE INVENTION

This invention is concerned with that portion of the agglomeration process which involves wetting and/or melting the surfaces of powders or small clusters of particles and urging the wetted and/or surface melted particles to randomly collide and adhere or fuse together to form agglomerates. The agglomerates, upon their formation, are directed to a zone for tempering, drying and cooling by conventional methods in conventional apparatus such as a drying tower.

More specifically, the invention constitutes improvement in vapor-solid contact apparatus and in the method of operating the apparatus to wet and/or melt the surfaces of particles or colligations of particles, urge random collisions of the particles and colligations, and contemporaneously, direct the agglomerates so formed into a zone for tempering and/or drying. While the use of a drying tower is the preferred method of drying the agglomerates, any other suitable means of drying may be utilized with the process and apparatus of the invention.

Briefly stated, the objects of the invention are accomplished by apparatus which effects a novel method of delivery, distribution, and orientation of the particles to be agglomerated for contact with the vapor or gaseous medium. Essentially, the invention encompasses an improved apparatus which, because of its unique design and structural reliability, consistently and effectively operates to deliver the particles to be agglomerated to the gaseous medium in the desired distribution pattern and at controllable rates for wetting and fusing concomitant with conveying the formed agglomerates into a tempering and/or drying zone.

The invention is predicated on the discovery that an oscillating vertical motion applied to a horizontal flat plate having a plurality of apertures or perforations, preferably uniformly spaced, will cause the plate to discharge powdered material, through the apertures, downwardly in the form of parallel rectilinear streams (or curtains) of material conforming substantially uniformly in cross section to the geometry of the apertures, provided the horizontal amplitude of vibrations of the plate is constrained to within about 50 percent of the vertical amplitude and preferably to within about 15 percent. cent.

Most surprisingly, it has been discovered that vibrations of the perforated horizontal plate in a vertical direction with substantially no horizontal amplitude of oscillation, in addition to causing the plate to deliver the particles in the form of a series of rectilinear compact streams of powder, will uniformly interrupt delivery of powder synchronously with the frequency of vibration to effect spatially uniformly discontinuous streams of material.

The rectilinear, spatially separated portions of the discontinuous streams of powdered material lose their uniformity and continuity after a short distance of vertical fall and spread or diverge into streams of individual particles and/or separated small clusters of particles. It has been found that the finer the original particles are in size, the greater is the tendency for them to be distributed as clusters or colligations of particles rather than individual particles.

A discovery which lies at the heart of the invention is the fact that at the time, or shortly thereafter, the streams lose their rectilinear geometry, the individual particles or colligations of particles so formed should enter the vapor zone and should be intercepted with a forceful jet of vapor, such as saturated steam, to interrupt their downward movement and, coincidentally to wetting, heating, and fusing to agglomerate form, urge the agglomerates into the drying zone. The spatial discontinuity of the discharge of material from the perforated distributor plate, facilitates the exposure of the particles to the vapor.

Collaterally, with this discovery is the finding that a wide range of agglomerates of different size, density, strength, and structure can be produced under controlled conditions by varying the grind size of the feed particles, the feed rate of the particles, amount of condensed vapor in the gaseous phase and the rate, point of introduction, and path of projection of the forceful jets of vapor.

It has been found, particularly with soluble coffee particles, that strong bonds of fusion can be formed between individual particles of coffee when the grind size is sufficiently large thereof to cause the rectilinear portion of the streams to spread into discontinuous diverging streams of individual particles. This formation apparently gives the vapor (steam) the opportunity to contact, wet, and fuse the individual particles together. However, as the particles fed to the vertically vibrating perforated plate approach a finer size, the tendency is for the plate to discharge rectilinear streams which spread and break up into clusters or colligations of particles. As the colligations of particles are intercepted by the forceful jets of steam, the steam wets substantially only the exterior or surface particles of the clusters and forms agglomerates with a smaller number of interior fusion bonds but with a strongly fused exterior or "shell." This granular type of agglomerate formation is generally denser and lighter in color than the honeycomb-like agglomerates formed from the large size particles and, although the former have a shell which resists abrasive forces to a greater extent than the agglomerates of larger particles, the agglomerates formed from colligations of particles are not as resistant to crushing forces. Those knowledgeable in the art of agglomeration will recognize the advantage of each type of agglomerate and will also appreciate the fact that a wide variety of agglomerates having structures intermediate of the types described is possible with the apparatus and method of operation to be described in more detail hereinafter.

The foregoing has been presented by way of an explanation of the phenomenon of agglomeration as carried out by the instant invention. Although such explanation is only intended as a theory as to what is believed to occur, and the invention is not to be limited thereto, microscopic and chemical tests have confirmed the different structural formation of agglomerates of small particles compared with those composed of large particles, and reveal agglomerates consisting of intermediate particle size to have structural features representative of combinations of both extremes.

The essence of the invention resides in the concept of the combination of physical elements in the apparatus embodiment which cooperate to provide the vertical oscillation necessary for proper distribution of particles to be agglomerated by contact with jets of vapor in a novel and unique manner to produce a variety of agglomerated products within readily controllable limits of desired physical characteristics. Accordingly, the invention comprehends apparatus and modes of operating said apparatus which provide an eloquent solution to a major problem — a solution which exhibits precision, neatness, and simplicity as will be hereinafter apparent from the following description of the apparatus and its operation, such description being given in conjunction with the accompanying drawing illustrative of a preferred embodiment of the invention.

BRIEF DESCRIPTION OF THE DRAWING

One embodiment of the apparatus of this invention is shown in the accompanying drawing in which like numerals denote like parts throughout the several views, and in which.

DESCRIPTION OF THE PREFERRED EMBODIMENTS

For purposes of explanation, the apparatus of the invention and its mode of operation, will be described in terms of how it is constructed and employed to produce soluble coffee agglomerates. It should readily be apparent to those skilled-in-the-art of agglomeration that the apparatus is capable of agglomerating substantially all powdered materials amenable to fusion for size enlargement and, with minor adjustments in operating variables which are described hereinafter, edible and non-edible powder having heat labile or non-heat labile characteristics can be successfully processed to form strong agglomerates having desirable physical characteristics under readily controllable operating procedures.

The term "fusion" as used herein means wetting, melting, cementing or coalescing of the surfaces of the various particles at the points of contact of these particles, to form agglomerates prior to tempering, drying and/or cooling.

The features of the invention which are believed to be novel are set forth with particularly and distinctly claimed in the concluding portion of this specification. The invention, however, both as to its organization and operation may best be appreciated by reference to the following description when read in connection with the drawings.

Figure 1:
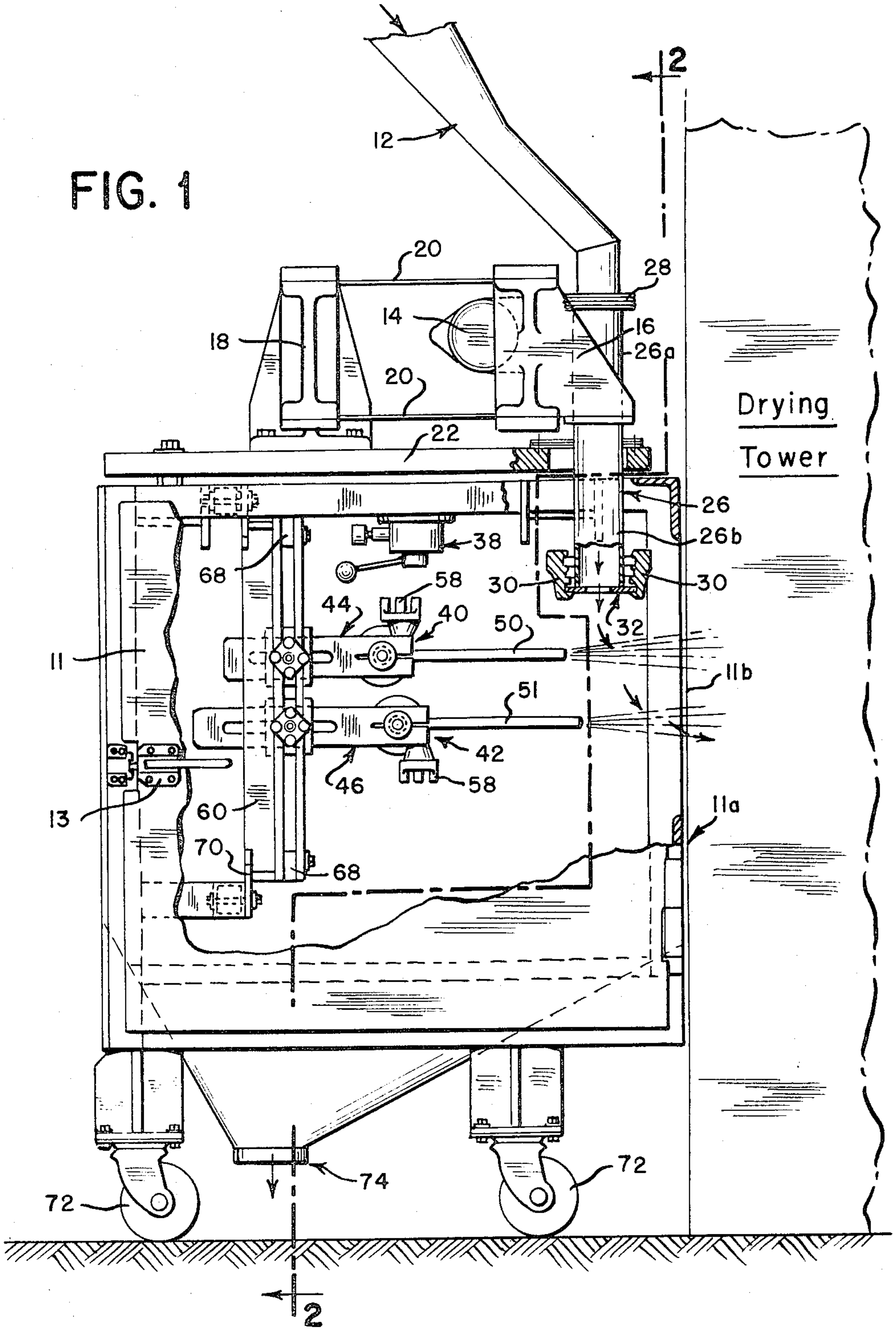
FIG. 1 is a side view in elevation of the apparatus of the invention, designated an "agglomerator feed port assembly," with a partial cut away to show the principal elements within the interior of the cabinet, and the opening through which the agglomerates are directed to a drying tower.

Referring to FIG. 1, the essential components of the apparatus, which is designated an "agglomerator feed port assembly," are housed in, and located atop, a cabinet 10 which contains and supports the components. Hinged panels 11 on both sides of the cabinet and having suitable latches 13 permit convenient entry to the interior of the cabinet for equipment adjustment purposes and for cleaning procedures when deemed necessary. The cabinet is mounted on casters 72 for ease of movement and positioning. The front wall **11*a* of the cabinet has a large opening 11*b*** which substantially conforms in size and geometry to a similar opening in a side wall in a drying tower in the proximity of the top of the drying tower (a segment of the side wall of the tower is indicated in FIG. 1) and, in operable position the cabinet is positioned abutted to the drying tower side wall such that both openings coincide to form a common passageway for the entry of the agglomerates and vapors to the drying tower. Drying towers of proportionately larger size and drying capacity, and having a plurality of similar openings about their side wall can, of course, accommodate more than one agglomerator feed port assembly.

Figure 3:
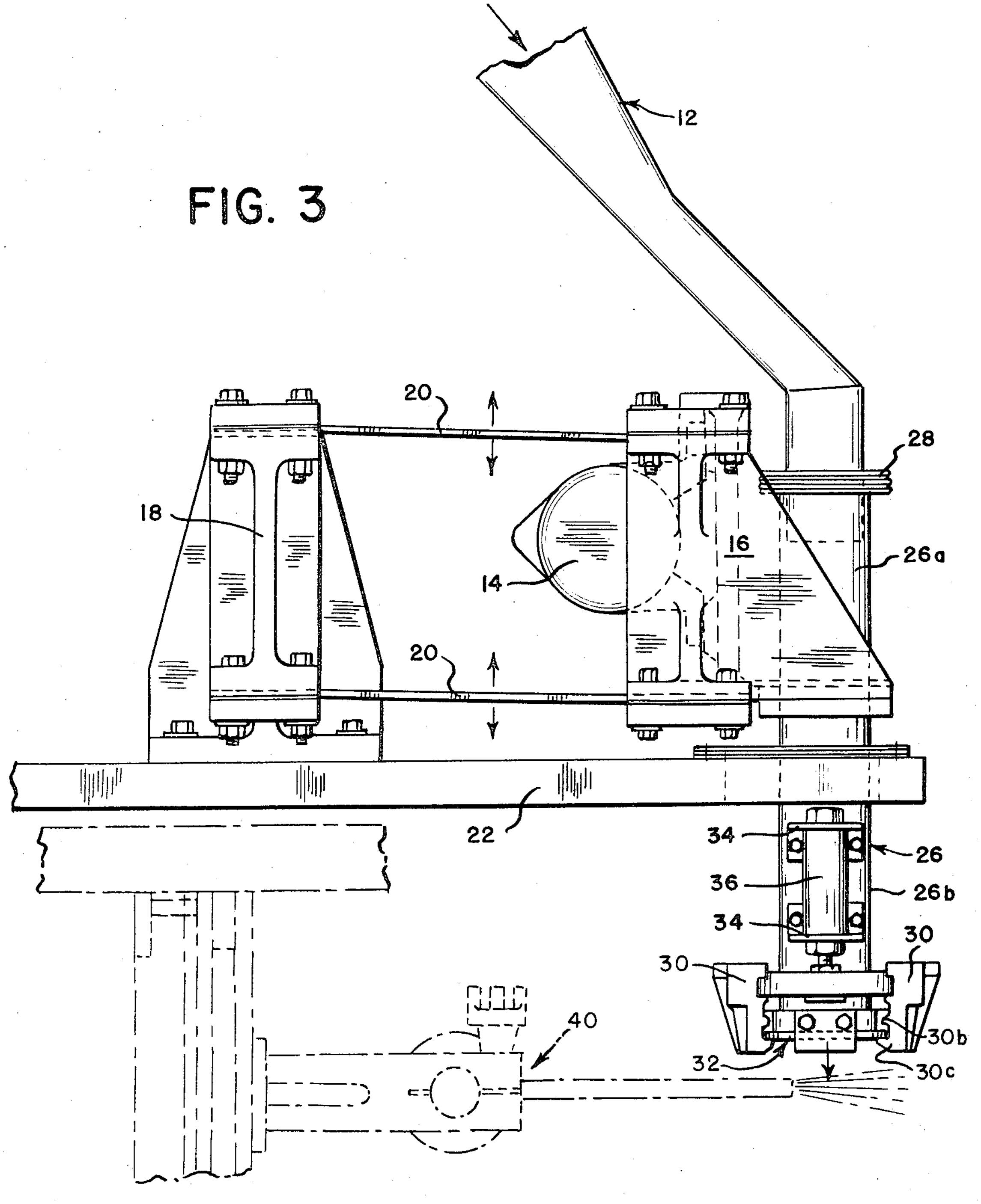
FIG. 3 is a side view in elevation of the vibrator mounting and the assembly for distributing the solid particles to be agglomerated.

As shown in FIGS. 1 and 3, a feed chute 12 is provided for the conveyance and introduction of particles of soluble coffee of the proper particle size distribution for agglomeration. The feed chute 12 communicates with, and is connected to, a hopper or bucket 26 by means of a flexible connector or boot 28.

Figure 4:
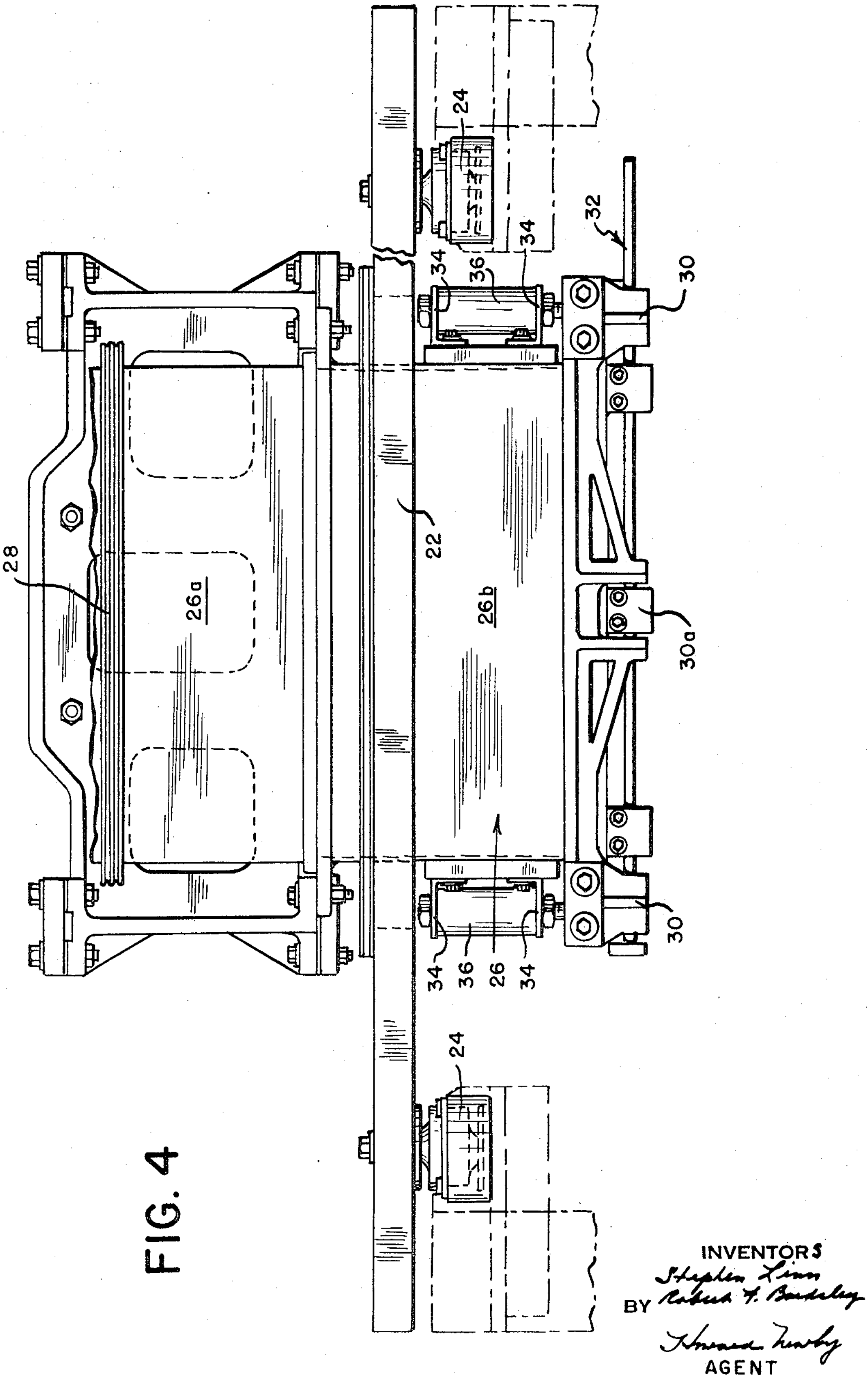
FIG. 4 is a front elevation view of the bucket mounting and distributor plate mounting showing the clamp assembly in detail.

Referring to FIGS. 1 and 4, the opening at the bottom end **26*b* of the bucket 26 is closed with a perforated distributor plate 32 held tightly in place by a plurality of clamps 30 actuated by two air cylinders 36 attached to opposite lower side portions 26*b* of the bucket and controlling the movement of the clamps through two angle brackets 34. The flow of compressed air to actuate the air cylinders in unison is controlled by means of the air control valve 38, (FIG. 1). The distributor plate 32 is slidably insertable between the shoulders 30*b* and 30*c* of the clamps and the bottom surface of the walls of the rectangular bucket when the clamps are in the downward position. When the air cylinders are actuated to urge the clamps upward, the distributor plate is then bearing tightly against the bottom of the bucket. Preferably, in order to form a more perfect seal between the distributor plate and bucket, the centrally located clamps 30*a* (see FIG. 4) are positioned to have a greater bearing force on the distributor plate than those clamps 30 at each end of the angle brackets. When it is necessary or desirable to remove the distributor plate, the air cylinders are actuated to urge the clamps downward with sufficient force to have the upper shoulder 30*b* (FIG. 3) of each clamp bear against the distributor plate top surface and thereby dislodge the plate from contact with the bucket for ease of removal for cleaning or exchange with another distributor plate. The circular hole in proximity of one end of the plate (see FIGS. 7 & 9**) facilitates grasping the plate for removal.

Again referring to FIG. 3, the bucket 26 is secured at its top portion **26*a* to the vibrator support 16. Up and down oscillating motion is provided to the vibrator support by the attached vibrator 14 acting in opposition to the biasing forces of the laterally-oriented four steel leaf springs 20 each of which are attached at their "-free" moving end to the vibrator support 16 and secured in cantilever fashion at their opposite ends to a vertical support 18. As will be noted, the base of the support 18 is secured to a seismic mass in the form of a heavy steel plate 22 which, in turn, is mounted on top of the cabinet 10 by means of shock mounts 24 (see (FIG. 4**), and the leaf springs extend laterally over a substantial area of the seismic plate.

The heavy duty vibrator (Motor Magnetic Company, Model DVE-250, 44OV 3PH or equivalent) is of the rotating eccentric type. The axis of rotation of the eccentric is horizontal and normal to the horizontally extending leaf springs. As can be seen from FIGS. 1 & 3, and the aforementioned description of the assembly, the rotation of the eccentric sets up forces which urge the bucket to vibrate in a vertical direction against the biasing forces of the cantilever mounted springs. The cantilevered springs 20, which support the bucket 26 are relatively flexible in the vertical direction and very rigid in the horizontal directions. Motions other than vertical in direction, which are set up by the rotation of the eccentric weight, are therefore transmitted to the seismic plate 22 which, by virtue of its large mass minimizes the horizontal components of motion of the bucket (and the distributor plate) and reduces the amount of vibration transmitted to the cabinet 10 through the shock mounted vibration isolators (25). Alternatively, a vibrator 14 having two counterrotating shafts with eccentric weights which resolve centrifugal forces into a single straight line (vertical) of force such as the Model AA Vibration Exciter manufactured the LAB Corp. of Skaneateles, New York, can be employed as the means of vibrating the distributor plate. It is to be noted that the bucket 26 is positioned within coinciding apertures in the seismic plate 22 and in the top of the cabinet 10 with sufficient clearance to avoid contact with either unit. The arrangement of the components which, together, make up the vibrating assembly is designed with sufficient structural strength to assure consistent vertical vibration of the bucket and distributor plate over prolonged periods of operation. The amplitude of the vertical oscillation of the distributor plate can, of course, be incremently changed by changing the position of the eccentric weight in the vibrator in relation to its axis of rotation or by substituting an eccentric of different weight. The frequency of the oscillations of the distributor plate is controlled by the rotational speed of the eccentric which, if desired, can be readily modulated with available electric motor speed control devices.

The novel design and construction of the vibrator assembly provides consistent vertical oscillations to the distributor plate at constant frequency and amplitude, and is conceived to reduce any horizontal motion of the distributor plate to a minimum — the importance of this feature, which lends itself to the production of agglomerates of superior physical characteristics at uniformly controlled rates, will be discussed in greater detail hereinafter.

Although vibrating assemblies incorporating design features which differed from those of the instant invention had been constructed and tested, all other assemblies were deficient in one respect or another and failed to perform satisfactorily. Commercially available vibrator feeders, air vibrators, and vibrators which operated the distributor plate through mechanical linkage failed to consistently provide the necessary degree and type of vibration to the distributor plate for the successful production of agglomerates in accordance with the concepts of the invention.

Figure 2:
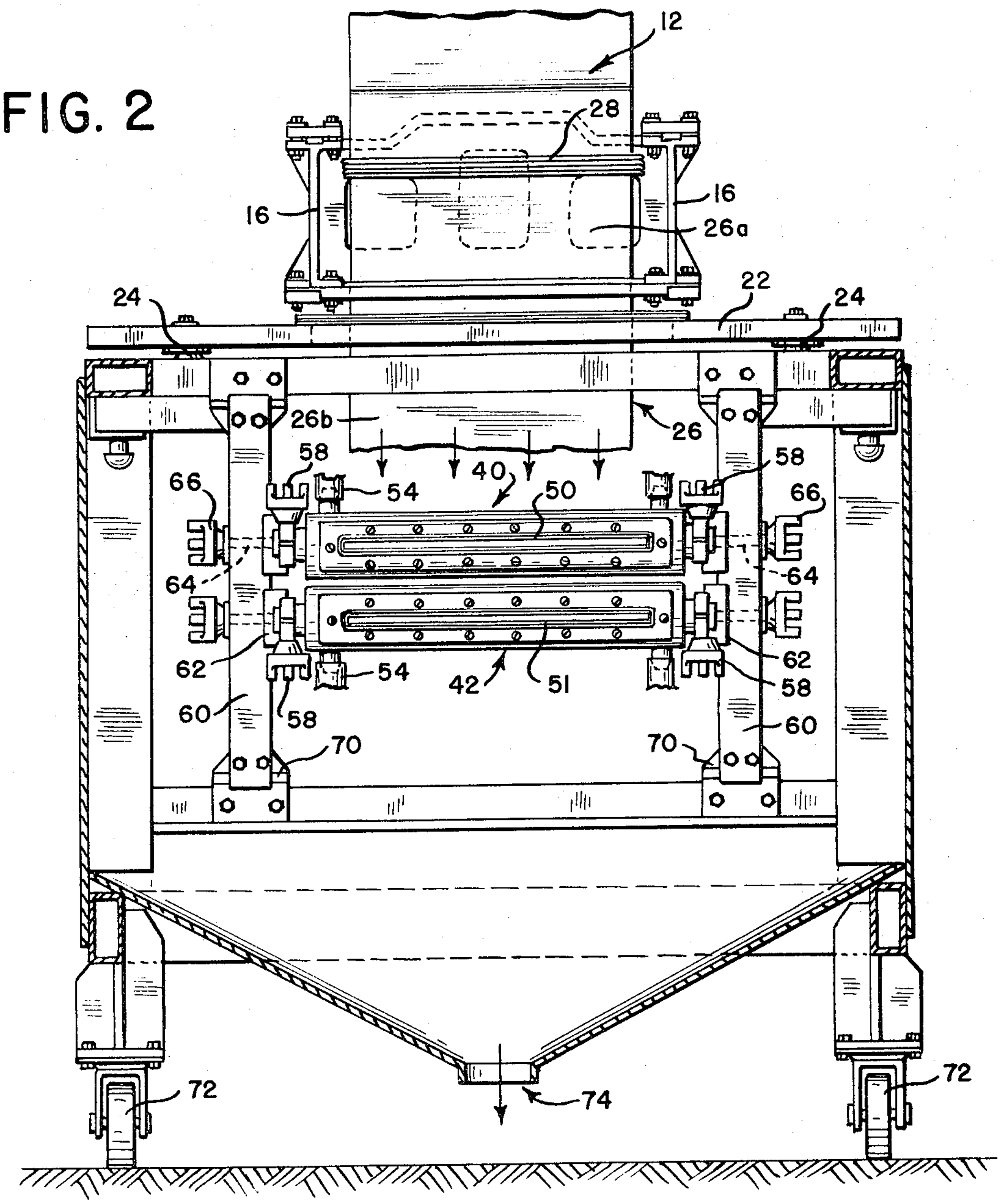
FIG. 2 is a sectional front elevation view of the apparatus taken along line 2—2 of FIG. 1.

As shown in FIGS. 1 and 2, two vapor manifolds 40 & 42 are located within the cabinet chamber in vertical spatial relationship and a distance below and to the rear of the distributor plate and are supported by, and secured to, their respective manifold supports 44 & 46. As shown, the vapor manifolds are secured to the manifold supports by means of the cylindrical lugs 56 (FIGS. 5 & 6) which extend from each side of each manifold. The lugs 56 are securely clamped between the jaws of the manifold supports and held in place by means of the threaded bolt and screw knob assembly 58. Loosening the jaws of the manifold supports 44 & 46 permits rotation of the vapor manifolds and proper adjustment of the angles at which the nozzles 50 & 51 project vapor into the falling curtains of powdered material discharged from the distributor plate.

The vapor manifold supports 44 & 46 are secured in proximity of their ends opposite the vapor manifolds to two vertically parallel uprights 60 and, as shown in FIGS. 1 and 2, the vertical and horizontal positioning of each vapor manifold can be accomplished by manually adjusting the height and lateral extension of the vapor manifold support by means of the locator 62, carriage bolt 64 and knob or spindle 66 assemblies. The uprights 60 are each constructed of two members spaced and held apart by the spacers 68 to form a vertical slot and are secured to the cabinet 10 by means of brackets 70.

As shown in FIG. 1, the vapor nozzles 50 & 51 within the cabinet chamber (with respect to the agglomeration of soluble coffee, the preferred vapor is saturated steam) are positioned so as to project the vapor across the vertical path of the falling particles and, incidental to agglomerating the particles or colligations of particles, urge them in a substantially horizontal direction through the opening in the cabinet and the coinciding opening of the drying tower into the interior of the drying tower for subsequent tempering, and drying. A slight draft created by the flow of drying air in the drying tower across the opening for the passage of the agglomerates, aids the steam in conveying the agglomerate into the tower.

Figure 5:
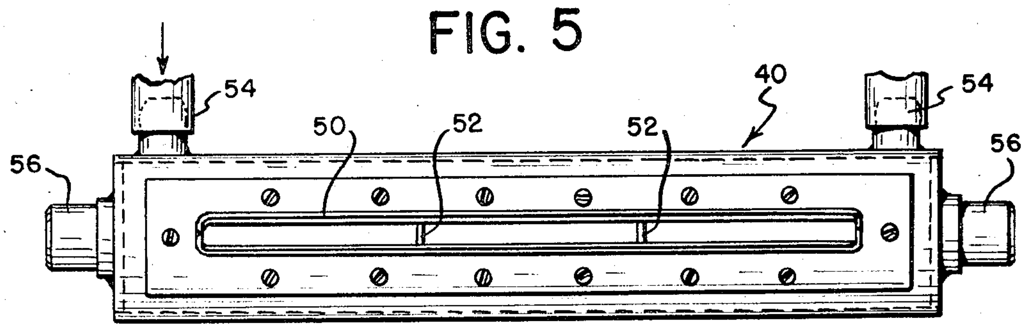
FIG. 5 is a detailed front elevation view of one vapor nozzle and manifold.
Figure 6:
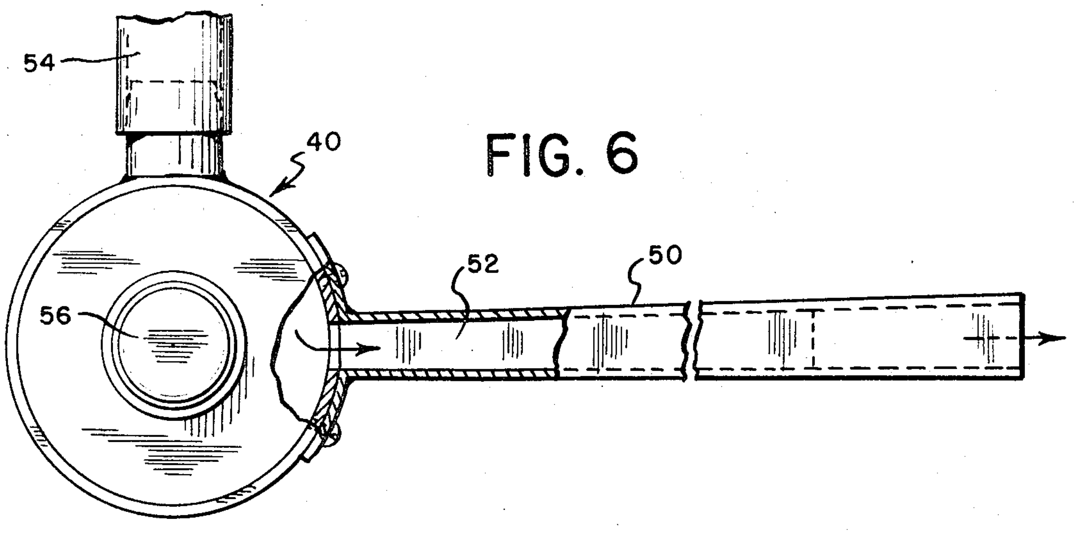
FIG. 6 is a detailed side view in elevation of the vapor nozzle and manifold.

As illustrated in FIG. 2, the steam nozzles 50 & 51 extend slightly beyond (about 1–2 inches on each end) the length of the vertical projection of the distributor plate 32 to assure complete contact of the falling powder material with vapor ejected from the nozzles. Vapor is supplied to each manifold assembly 40 & 41 by means of flexible hose (not shown) to the vapor ports 48 (FIGS. 5 & 6) at each end of each of the vapor manifold assemblies. The entry of vapor at each end of the manifolds and the positioning of the baffles 52 in each of the nozzles as illustrated in FIG. 5 are provided to insure substantially uniform emissions of vapor across the length of the slit-type nozzles. The baffles also aid in providing structural stability to the nozzles and prevent undue deflection of the metal when the nozzles are heated by the vapor.

In order to recover material which is not properly agglomerated and/or conveyed to the drying tower, particularly during start-up and shut-down operations, the cabinet is provided with a bottom opening 74 (FIG. 1) through which this material is flushed to a recovery tank for "re-work" purposes.

In operation, the finely ground soluble coffee powder to be agglomerated is conveyed to the bucket 26 and perforated distributor plate 32 at a carefully controlled rate. The rate of delivery of the powdered material to the bucket is adjusted to a uniform value which is slightly less than that which the vibrating perforated plate can discharge. That is, the perforated plate, oscillating at its proper frequency and amplitude of vertical vibrations, is slightly "starved" fed and no accumulation or significant build-up of powdered coffee should occur above the plate. In effect, however, since the delivery of powdered soluble coffee to the plate is uniform, there is a slightly substantially instantaneous build-up of material above the plate during each half cycle of vibration and this momentary build-up is substantially completely discharged during the succeeding half cycle of vibration of the plate. The success of the repetitive cyclic discharge of the powdered material from the distributor plate in a uniform rectilinear pattern is dependent on the plate being vibrated in a substantially exclusive vertical direction at the proper amplitude and frequency conforming to the rate of delivery of powdered material to the plate. In the conception and design of the apparatus of the invention, this feature of nearly pure vertical vibration of the plate was considered of paramount importance and every effort was made, within practical considerations, to assure this particular functionality of the apparatus. The apparatus as shown in the drawings and described hereinabove is believed to be novel and the cooperative action of the vibrator, springs, seismic plate, and shock mounts has successfully operated to provide almost "-pure" vertical vibration to the bucket and horizontal perforated distributor plate over prolonged periods of operation.

Figures 9, 10:
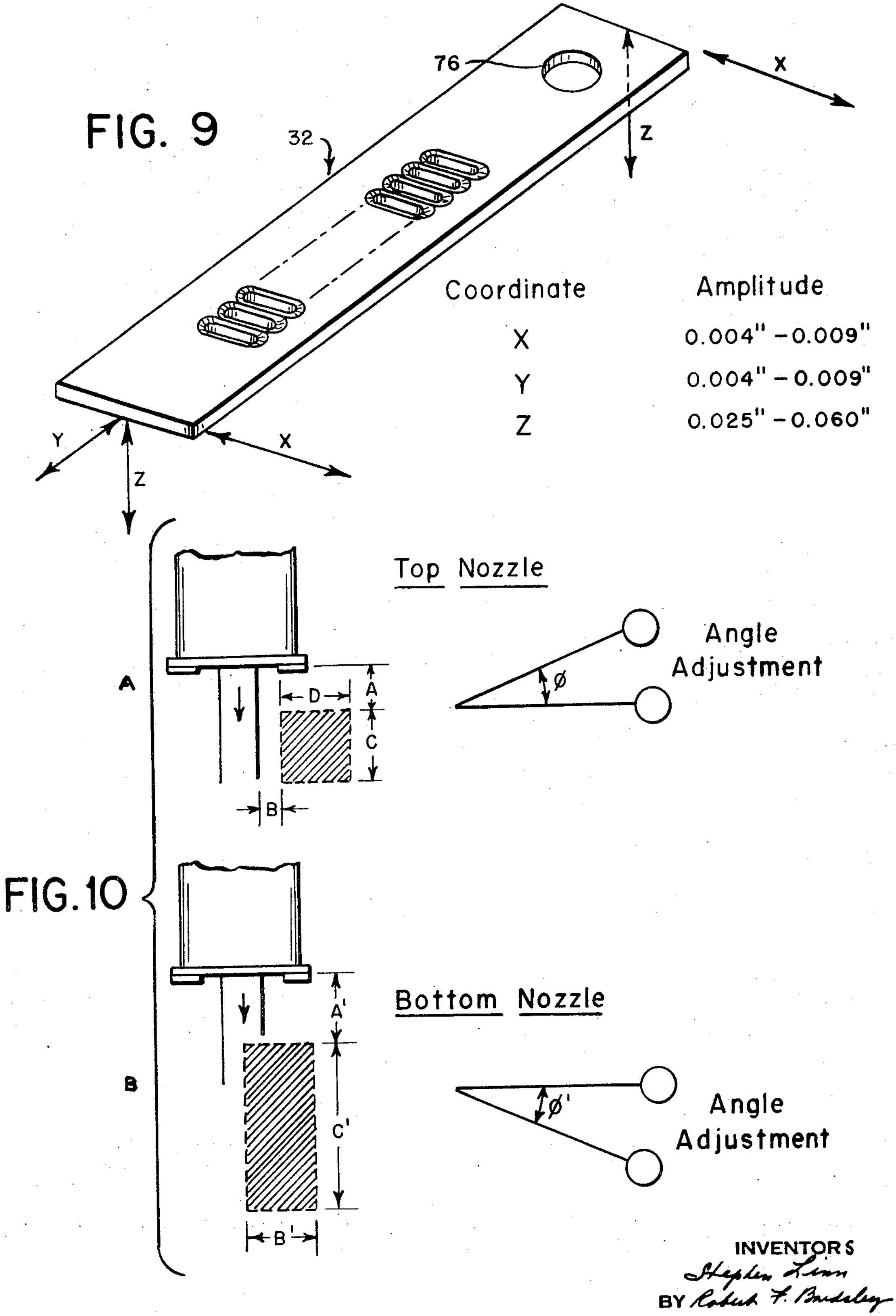
FIG. 9 is a perspective view of the perforated plate distributor showing the location of the apertures and identifying the vectors which denote the directions and amplitudes of the vibrations as discussed in the specification.
FIG. 10 is a diagrammatic illustration of the preferred operable range of nozzle positions with respect to angles with the horizontal and location of the forward edge of each of the nozzles with respect to the bottom surface of the perforated distributor plate.

When employing the apparatus for the production of soluble coffee agglomerates, the preferred frequency of vibration of the distributor plate has been determined to be within the range of 3000 to 4000 cycles per minute and the vertical amplitude of oscillation to range from about 0.025 inch to about 0.060 inch. The vertical amplitude of the plate is indicated as the Z component of amplitude in FIG. 9. With the above range of frequencies and magnitudes of vertical amplitude and employing a plate with uniformly spaced slits as the perforations, it has been found that the X and Y horizontal amplitude components as shown in FIG. 9 should preferably be about 15 percent of the vertical amplitude and should be constrained to values below about 60 and 40 percent respectively of the vertical amplitude for ideal distribution of the soluble coffee particles. Whenever the horizontal components of amplitude exceed these values it has been determined that the rate of discharge from the perforated distributor plate is reduced and, in many instances, the pattern of discharge is unsatisfactorily distorted with the net effect that poor agglomerates are formed at low and erratic production rates.

Figure 7:
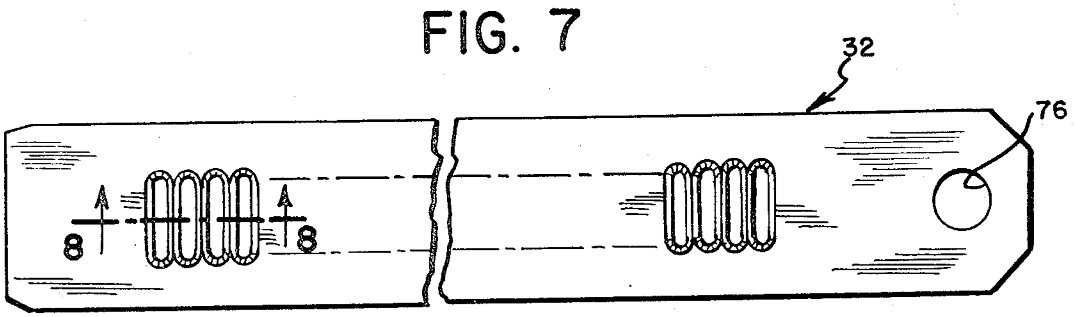
FIG. 7 is a detail of the perforated distributor plate showing a preferred construction in which the plate has a series of parallel uniformly spaced slit-type perforations.
Figure 8:
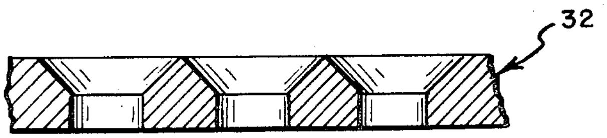
FIG. 8 is a view of a section of the perforated plate of FIG. 7 in elevation showing the construction of the plate in which the slits therein have beveled top edges.

For the agglomeration of soluble coffee particles, a distributor plate having apertures in the form of slits is preferred (FIG. 7). It has been established that the widths of the slits in the distributor plate can be varied over a range of approximately one-eighth inch to about three-eighths inch without materially affecting the rectilinear formation of powdered coffee discharged. Experience has shown that, with a constant frequency and amplitude of vertical vibration of the distributor plate, the larger the slit width (within the above range) the higher the thru-put of powdered coffee through the distributor plate. A preferred construction of the plate to form slits having chamfered or beveled edges is shown in FIG. 8. This method of construction of the distributor plate minimizes the amount of horizontal surface of the plate and a plate so formed has a higher capacity than a plate having slits of the same width and length with vertical walls throughout the thickness of the plate. However, with a distributor plate having slits with top beveled edges, straight line vertical motion of the distributor plate is of the utmost importance for distribution of the powdered material in the rectilinear pattern essential for effective agglomeration.

Although the above description of the apparatus has been provided with the distributor plate having slit-type apertures as illustrated in FIGS. 7, 8, and 9, other geometric forms of apertures are feasible and effective. The slit-type apertures have been deemed to be the most effective type of distributor plate apertures for the distribution of powdered coffee and the apparatus has operated successfully with the slit-type distributor plate on a commercial basis over prolonged periods for the production of soluble coffee agglomerates. However, other powdered materials and/or other types and grind sizes of powdered soluble coffee can be effectively distributed with distributor plates having circular, oval, or square apertures of appropriate areas and spacings. The critical features of the distributor plate are area of openings for a desired thru-put of powdered material, substantially exact horizontal orientation, and vertical vibration at the proper frequency and amplitude to the exclusion, or nearly complete restraint, of horizontal amplitude of vibration. Those versed in the art of vibrating equipment will recognize that adjustments of any one or all of these factors should permit the apparatus to accommodate a wide variety of powdered materials over a range of capacities and, in each instance, effect the desired spatially interrupted rectilinear pattern of powdered material discharge to the vapor zone beneath the distributor plate. There will be, of course, one set, or narrow range of conditions of feed rate, distributor plate perforation pattern and area, frequency and amplitude of vibration, vapor rate, etc. which is optimum for the agglomeration of each individual type of powdered material.

In order to agglomerate the powdered material which is distributed and projected in a downward direction from the perforated distributor plate, the falling particles enter a vapor zone within the cabinet chamber in which they are intercepted by jets of vapor (steam in the case of soluble coffee) which, as indicated in FIG. 10 are projected at a substantial angle to the direction of vertical fall of the particles. As shown in FIG. 10, the forward edge of the steam nozzle tip should be oriented to be positioned within the area indicated by the cross hatching in the figure. The preferred operable zone for positioning the forward edge of the top nozzle with relation to the bottom of the distributor plate is indicated in the figure wherein dimension A which should range from about 1 inch to about 3 inches and dimension B should range from about ½ inch to about 2 inches. The other dimensions of C and D should range from about 2 inches to about 4 inches. The angle of projection ($\phi$) of the top nozzle should preferably range from about 0° with the horizontal to about a 30° angle of downward projection with the horizontal.

Similarly, as shown in FIG. **7*b*, the lower nozzle should be positioned with an upward direction of projection at an angle ($\phi'$) ranging from substantially 0° with the horizontal to about a 30° angle with the horizontal and the forward edge or tip of the lower nozzle should be positioned such that spatial relationship with respect to the bottom of the distributor plate is such that A′ is from about 2 inches to about 4 inches; B′ is from about 0 inch from the center of the pattern of falling particles to about 4 inches behind the pattern center; and C′ is from about 6 inches to about 8 inches. With the top and lower nozzles positioned as shown in FIG. 10**, the apparatus is capable of accommodating powdered materials of different particle size, density, wetting and fusion characteristics by adjustment of the nozzles to the optimum position within the indicated areas to provide the preferred mode of operation for optimum agglomeration in each individual situation.

In general, and particularly with respect to soluble coffee powder, it has been found that when other operating conditions are held constant, an increase in the velocity of the steam contacting the power during its vertical fall will cause a significant decrease in the bulk density of the agglomerates so formed. In some instances, it has been established that this effect occurs regardless of independent changes in the feed rate of the powered material to the steam zone.

For those heat labile materials such as soluble coffee particles, low temperatures are desired for the prevention or minimization of flavor degradation and it is essential that the steam temperature be maintained at or near 212°F. Saturated steam or, more preferably, steam with entrained moisture is best suited for the agglomeration of soluble coffee and for other materials where a combination of wetting plus melting are essential to cause agglomeration by fusion. Again, with respect to the agglomeration of soluble coffee particles, superheated steam is to be avoided whenever possible and steam temperatures exceeding 230°F. are not to be condoned in order to avoid sacrificing product flavor quality. In fact, the preferred method of operating the steam nozzles when agglomerating soluble coffee powder is to have a slight drippage of water from the tips of both nozzles. Suitable amounts of entrained water in the steam to attain this effect can be obtained by injecting water into the steam upstream of the nozzles. For the agglomeration of soluble coffee particles with steam, it has been determined that a quantity of saturated steam ranging from 0.4 to 1.2 the weight of soluble coffee particles distributed in the steam zone is essential for adequate agglomeration and a steam to soluble coffee ratio of 1:1 by weight is preferred.

From a purely practical standpoint, steam vapor is the most suitable vapor phase to be used in the apparatus for agglomerating food and other fusible particles. The apparatus, however, is not limited to the use of steam or water vapor and, as will be recognized from the description of its operation, can be employed with other gaseous materials which, of themselves or in combination with steam wet, heat, and impact the particles to be agglomerated. Such vapors as those emanating from ground roasted coffee or other aromatic fractions of coffee may be mixed with the steam and used as a combination of vapors or may be interjected into the steam zone through properly positioned auxiliary nozzles. Heated vapors or gases, such as $CO_2$, air, and nitrogen with or without entrained water vapor or coffee extract can also be employed as full or partial replacement of steam by introduction through either or both nozzles as described above or through auxiliary nozzles properly situated to project the gas or vapor and augment the agglomeration and trajectory of the agglomerates into the drying zone.

As stated hereinabove, the salient point and dominate feature of the invention and that which is embodied in the apparatus is to provide a distinctive and novel pattern orientation of particles or colligations of particles prior to and at the time they are contacted with the vapor. The invention is predicated on the discovery that vertical vibration of the distributor plate to the exclusion of substantially any horizontal amplitude of oscillation provides this unique pattern.

The term "colligation" as used herein is intended to mean the grouping together, binding, or otherwise uniting a multiplicity of particles to form small cluster of particles prior to these clusters being agglomerated as a single unit or with other clusters or individual particles. It has been determined, for example, that soluble coffee particles of very small size will inherently tend to form colligations or clusters as the finely ground material is fed to the distributor plate and will retain their cluster formation when discharged from the vibrating distributor plate. It is theorized that electrostatic forces cause the particles to be attracted to each other to effect this small cluster form, but regardless of how they are formed, they represent aggregations of tightly compacted coffee particles which, when agglomerated in the apparatus of this invention, form a novel and unique agglomerated soluble coffee product. Essential to the invention is the fact that the clusters or colligations also respond to the pure vertical vibration of the distributor plate in a manner similar, if not identical, to the individual particles.

Figures 11, 12:
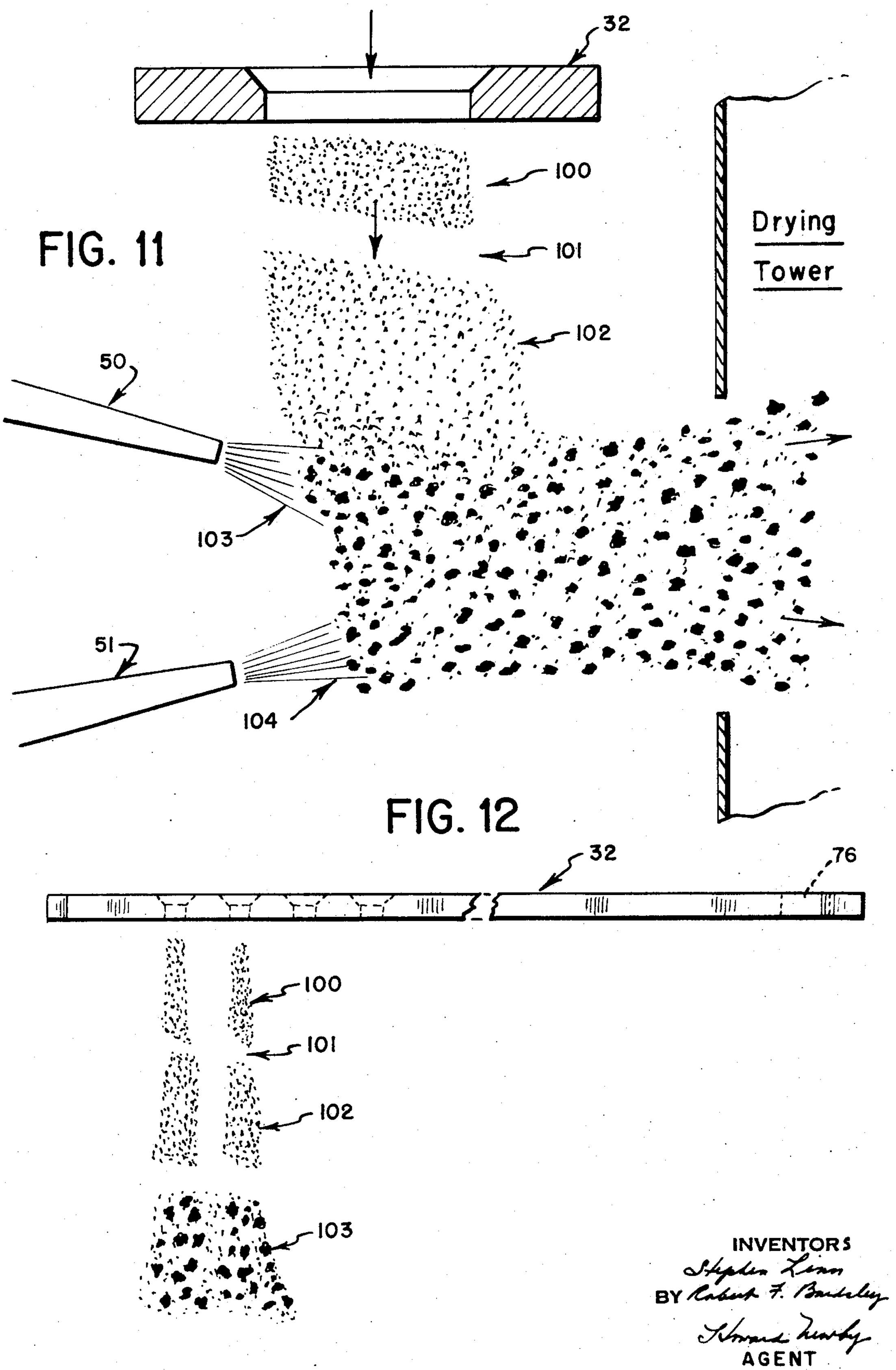
FIG. 11 is a schematic view of the configuration of the spatially interrupted curtains of powdered material discharged from the perforated distributor plate.
FIG. 12 is a view of the configuration of the powdered material streams as viewed in the direction of the vapor jet trajectory.

The following statements along with the aid of FIGS. 11 & 12 are provided to describe one exemplary novel pattern of discharge of powdered material from the vibrating distributor plate as can be observed with stroboscopic and slow motion photography. When employing a distributor plate with a plurality of uniformly spaced slits and operating in a substantially pure vertical oscillation, the powdered material is discharged from each slit as a rectilinear curtain of fairly well compacted particles. The curtains conform in geometry to the cross sectional areas of the slits and fall parallel to each other. The time interval of fall of each curtain is governed by the frequency of the vibration of the plate and, at about 60 cycles per second, the fall lasts approximately ½ second. During the other half of the cycle, there is substantially no discharge of material and this interval creates a momentary build up of powdered material in the bucket above the plate and creates a void beneath the plate before the next set of parallel curtains is discharged. In effect, and for want of a better description, the particles are discharged from the slits of the vertically vibrating plate in a pattern which may be linked in appearance to that of pickets in a plurality of parallel short lengths of picket fence when the lengths of the fence are turned on end. As previously stated, this effect can only be discerned from photographs taken under special conditions and, to the naked eye the pattern of particle discharge appears to be that of a plurality of continuous, unbroken streams of material.

Photographically, as viewed from the side of the distributor plate parallel to the length of the slits, one set of interrupted curtain portions of material appears as schematically shown in FIG. 11. The top-most portion 100 of the full curtain is in substantially rectilinear geometry as it leaves the slit. Directly beneath, but spatially separated 101 the previously discharged portion of the interrupted curtain is shown 102. Since this portion 102 of the curtain has fallen farther than portion 100, it has become distorted to some extent and is shown as just beginning to lose its rectilinear formation as it enters the turbulent vapor zone. Directly below curtain portion 102 is shown the previously discharged portion 103 which has been impinged by the jet of vapor emanating from the edge of the nozzle. As shown, the particles in curtain portion 103 are being wetted, heated, and impacted to agglomerate form while being conveyed in somewhat horizontal fashion to the drier opening located to the right. Since some of the particles agglomerate easier than others and thereby form large heavy agglomerates 104 which fall with less horizontal deflection than the smaller particles and agglomerates, the larger agglomerates are intercepted by the jet of vapor ejected from the lower nozzle and are broken into smaller agglomerates and conveyed into the drying zone by means of the augmenting jet of vapor from the lower nozzle.

The critical features of the interrupted curtain-type pattern of distribution of the particles by the vibrating distributor plate are two-fold. Firstly, the particles are compacted closely together as they are discharged from the distributor plate and are intercepted by the jets of vapor at just about the point where they begin to separate slightly from each other — it is at this point where the vapor can contact each particle to wet and heat it, yet the particles are sufficiently closely adjacent to permit many effective collisions over the prolonged period of travel with the jet of vapor into the drying zone, especially when the vapor is projected, as shown, at the edge of the curtains in a direction substantially parallel to their longest dimension. Secondly, the spatial interruption of the curtain formation permits the vapor to freely pass through the curtains at the voids and permits the particles to fall into a zone of vapor immediately prior to, or at the time of being intercepted, by the full force of the vapor jets — this feature, it is believed, further facilitates wetting and heating of particles to form strong agglomerates. FIG. 12 is a schematic illustration of the interrupted curtains as viewed on edge showing the approximate amount of separation of particles as viewed from the direction of the path of the jets of vapor.

In order that the present invention may be more clearly understood, reference will now be had to the following examples which illustrate the various facets of the invention. It should be understood, however, that these examples are merely meant to be illustrative and the invention is not to be limited thereto.

EXAMPLE I

The apparatus, as described and equipped with a distributor plate having a series of parallel rectangular slits uniformly spaced throughout its area, was employed to agglomerate soluble coffee powder. The effective dimensions of the distributor plate were 4 inches by 15 inches and the dimensions of the uniformly spaced slits were ¼ inch × 2½ inches formed in the plate on 7/16 inch centers. The distributor plate was caused to vibrate vertically at 3600 cycles per minute with an amplitude of 0.040 inch. The horizontal amplitude of vibration was measured to be less than 0.005 inch.

Spray dried soluble coffee powder, milled to a particle size distribution of 50 percent of the particles being smaller than 25 – 40 microns and at a temperature of 50°F. was introduced on the vibrating distributor plate at a uniform rate of 2100 lbs. per hour. The moisture content of the powdered soluble coffee delivered to the plate was 3.0 percent. Soluble coffee having these physical characteristics was discharged and distributed by the vibrating plate in the form of interrupted curtains of individual particles — not clusters or colligations of particles — the pattern of which conformed to the aforementioned description in the specification. The top nozzle has been manually adjusted to have its tip or edge located 1 inch behind the edge of the distributor plate and 3½ inches below the plate and had a downward angle of projection of 10° with the horizontal. The bottom nozzle had been similarly adjusted so that its tip or edge was located 1½ inches in back of the center line of the distributor plate and 6½ inches below the bottom of the plate. The angle of projection of the bottom nozzle was upward 10° with the horizontal.

Saturated steam was supplied to both the upper and lower nozzles (each having an effective cross sectional area of opening measuring ½ inch × 18 inches) from a supply line at which the steam pressure was adjusted to 20 psig. The velocity of the steam ejected from the nozzle was measured with a pitot tube placed at several positions across the tip or edge of each nozzle, and was shown to average a velocity which created a static pressure as sensed by the pitot tube of 0.75 inch of water. Prior test work showed the combined steam rate from both nozzles at these conditions to be about 2000 lbs. per hour.

Under these conditions of operation of the apparatus, the powdered particles were satisfactorily agglomerated and conveyed into a drying tower of conventional design. Tempering and drying of the agglomerates of soluble coffee were accomplished in the tower with 350°F. inlet air and 240°F. exiting air temperature. The dried agglomerated soluble coffee was then cooled to 85°F. and bulk stored prior to packaging.

The agglomerated product had excellent flavor with no indication of excessive heat degradation. The moisture content of the product was 2.5 percent and the bulk density was 0.2 grams/cc. The agglomerated material was classified on a Rotex screen assembly employing screen sizes of 2, 6, and 30 mesh. A seive analysis of the material on the 6 and 30 mesh screens showed a particle size distribution of 16 percent by weight through U.S. Standard Seive No. 6 and on No. 8; over 45 percent through a No. 8 Seive and on a No. 20; and less than 15 percent through a 40 Mesh Screen. The product was a honeycomb fluffy-type agglomerate with a satisfactory dark coloring with no speckled appearance and had excellent crush strength.

EXAMPLE II

Several comparative agglomeration test runs were made employing the apparatus of the invention over prolonged periods of operation at commercial production rates of about 2000 lbs. per hour of product. Table 1, below, is provided for the purpose of illustrating the range of operative conditions of the apparatus to yield agglomerated soluble coffee product having substantially the same physical characteristics as the product described in Example I.

TABLE 1

Agglomerator Operating Conditions to Produce Dark-Colored Agglomerates of Soluble Coffee Having a Bulk Density of 0.195 ± 0.05 Grams/cc

| Variable | Range |
|---|---|
| Feed Powder Grind Size | 50% Finer Than 25–40 Microns |
| Powder Temperature to Distributor Plate | 40°F. – 90°F. |
| Powder Moisture | 2.5 – 3.5% $H_2O$ |
| Powder Rate | 2100 – 2400 Lbs./Hr. |
| Steam Rate | 840 – 2880 Lbs./Hr. |
| Steam Pressure (Both Nozzles) | 15 – 30 psig |
| Steam Temperature (Both Nozzles) | 200° – 230°F. |
| Steam Impact Pressure at Nozzle Exits | 0.5 – 1.0 inch of water |
| Steam Quality | Slight Superheat Entrained Water |
| Distributor Plate Overall Area (Effective) | 4" × 15" (Constant) |
| Slit Size (Rectangular) | 1" – 3" length; ⅛"–⅜" width |
| No. of Slits | 30 – 45 |
| Drier Conditions | |
| Inlet Air Temperature | 330° – 450°F. |
| Outlet Air Temperature | 230°– 270°F. |
| Agglomerate Moisture | 2.5 – 4.0% $H_2O$ |

EXAMPLE III

Effect of Steam Velocity of Impact on Soluble Coffee Agglomerated Product

Several test runs were made to establish the optimum steam velocity for impacting powdered soluble coffee to produce satisfactory agglomerated products. The results of the test show that steam ejecting from the nozzles at the higher velocities (within that range of velocities which produce a static pressure as measured by pitot tube of 0.45 inch water to 4.0 inches water) will create agglomerates of soluble coffee which are lower in bulk density that those products with steam velocities at the low end of the range. These tests were made on prototype apparatus similar in design and functionality to that described in the instant specification. While the effect of steam velocity on the bulk density of the agglomerated product was significant, the effect of steam velocity on the particle size distribution of the agglomerate product was less conclusive. The test runs did show that the hardness of the agglomerated product decreased as the steam velocity was increased over the range indicated by a static pressure of 1.0 inch water to 4.0 inches water. The results tabulated below show the variations produced in the physical characteristics of the agglomerated products when all conditions of operation similar to those described in Example I were held constant with the exception of the steam velocity. Under normal conditions of operation, the static pressure due to steam velocity impact as indicated in Example II is 0.5 – 1.0 inch of water.

TABLE 2

Effect of Steam Velocity of Impact on Soluble Coffee Agglomerated Product

| RUN | | A 1 | A 2 | A 3 | A 4 | A 5 |
|---|---|---|---|---|---|---|
| Steam | Top | .45 | 1.0 | 1.6 | 2.3 | 4.0 |
| Velocity * | Bot. | .45 | 1.0 | 1.6 | 2.3 | 4.0 |
| Density | | .237 | :214 | .197 | .200 | .179 |
| Hardness** | | 11.4 | 5.0 | 9.4 | 12.0 | 14.0 |

* As measured by static pressure at nozzle opening (inches of $H_2O$).

** Hardness is measured by an attrition test where the agglomerated product is screened in a standard Tyler Rotap mechanism employing standard seives sizes 8, 12, 16, 20, 40 and pan. The material is screened without the tap for 30 seconds and that portion which passes through the 40 mesh screen is weighed and then discarded. The remaining material is further screened for 5 minutes with the tap in operation and that material which, after 5 minutes of screening, passes through the 40 mesh screen, is weighed. The hardness is calculated as being the percentage of material through the 40 mesh screen after the 5 minute screening procedure, based on the total weight of material less that which was discarded after the first 30 seconds of screening.

EXAMPLE IV

Effect of Very Small Particle Size on Soluble Coffee Agglomerate Formation

As stated hereinabove, very small (100 percent less than 25 microns) soluble coffee particles inherently tend to form small colligations or clusters when conveyed through chutes by gravity or other means. Apparently, electrostatic forces which are generated by the movement of the coffee are sufficient in magnitude to urge the small particles to form localized concentrations or clusters. It has been determined that these clusters, delivered to the distribution plate of the apparatus of the invention, are distributed through the slits of the vertically vibrating plate while retaining their colligated formation and the clusters are distributed in a manner conforming to the rectilinear pattern described for the larger individual particles of soluble coffee.

When the curtains of clusters are intercepted by the forceful jets of steam, they are subject to less turbulence than the individual particles and the steam acts to form agglomerates different in structure from those formed by the steam acting on individual soluble coffee particles. When intercepted by the forceful jets of steam, it appears that the outermost fine particles of the clusters are wetted and heated with the result that, when fusion takes place, it is limited to the outer most particles of each cluster which appear to enclose a number of substantially unfused particles in the center thereof. When viewed under the microscope the product obtained when the apparatus of the invention distributes clusters of very fine soluble coffee particles (2 – 25 microns) in the above described pattern for agglomeration, is seen to have a structure which is different from that obtained with the larger particles. The individual agglomerates appear to consist of an outer "shell" surrounding a matrix of discrete fine particles of coffee powder which appear not to have undergone any change but are closely packed within the shell. In general, the outer shell is more than one layer of particles in thickness and the agglomerates so formed have a light golden-brown color due to the reflection from the fused surfaces.

For purposes of producing light golden-brown colored agglomerates, which are granular in appearance and have densities in the range of about 0.25 to about 0.40 grams/cc., the same condition of operation of the apparatus as described in Example I are to be employed with the exception that the feed particles of soluble coffee to the apparatus are milled to the very fine size of 100 percent less than 25 microns and, preferably, in the range of 2 – 15 microns.

In addition to the differences in density, the agglomerates produced from the cluster formation exhibit significantly different colorations from those produced by the agglomeration of individual larger particles. The difference in coloring is attributed to the glazed granular appearing surface of the cluster-type agglomerates vs. the fluffy, irregular honeycomb-like structure of the agglomerates produced from the larger particles (above 25 microns approximately).

The differences in color between the two types of agglomerates is indicated by a measure of the reflectance of the agglomerates from a tri-simulus light source. For this purpose, the agglomerates are placed in a small flat dish and measurements are taken by a Photovolt Reflection Meter (manufactured by the Photovolt Corp. of New York and used as described in their brochure). Although the meter is already calibrated in arbitrary Lumetron units, it is necessary to have a reference color measurement based on prepared colored surfaces. Thus, for the purposes of interpreting the figures quoted herein and in other places in the specification, commercially freeze dried instant coffee powders normally available in the U.S. have a Lumetron value of 28 to 30 units (relatively light in color) and normally available roast and ground coffee exhibits a range of 14 – 20 (relatively dark in color). The agglomerates formed from the cluster formation exhibit a Lumetron value approximating 32 compared with a Lumetron value of 21 for honeycomb-like agglomerates produced by a fusion of individual larger particles.

EXAMPLE V

U.S. Pat. No. 3,424,589 discloses the formation of strong, fused agglomerates of soluble coffee particles having the flavor of the initial soluble coffee to be possible by moistening the coffee to a level which renders the particles sticky, contacting the sticky particles to form agglomerates, adding sufficient moisture to said agglomerates to lower the thermoplastic point of the coffee at the contact points to a level which will not degrade the essential coffee flavor but insufficient to dissolve said contact points, and then heating said moistened agglomerates to above the thermoplastic point of the coffee during drying to obtain a fused agglomerate. An operable moisture range of 4 – 8 percent for the agglomerates is suggested for fusion with the agglomerates having a higher surface moisture (8 – 15 percent) at the time they are fused and dried.

The versatility of the apparatus of the instant invention and its capability to agglomerate soluble coffee in accordance with the concepts disclosed in U.S. Pat. No. 3,424,589 can be demonstrated by employing all of the conditions of operation described in Example I with the exception of introducing the feed coffee particles at a moisture content of 5 – 6 percent and after further impacting the coffee particles with additional steam vapor according to Example I and thereby forming high moisture agglomerates, fuse and dry the agglomerates in a drying tower operating with an inlet air temperature at or approximately 600°F. The agglomerated product obtained will be non-speckled and uniformly darker in color than the product of Example I (Lumetron value about 17 – 18), and, significantly, will have added agglomerate strength when subjected to packaging and shipping tests. The bulk density of the agglomerated product will range from about 0.10 to about 0.30 grams/cc.

EXAMPLE VI

The procedure of Example I was repeated with two apparatus of the instant invention placed in diametrically opposing positions abutting the drier tower wall. When operated under the conditions described in Example II, the capacity was approximately doubled by control of the known drying tower variables.

EXAMPLE VII

Further versatility of the apparatus can be put to advantage to improve the flavor and/or aroma of the agglomerated coffee products by agglomerating soluble coffee powder as in Example I and VI and introducing suitable amounts of coffee aromas into the steam vapor zone by appropriate means through the steam nozzles as described; or by means of auxiliary nozzles suitably positioned in the apparatus assembly.

Upon consideration of the foregoing, it will become apparent to those skilled-in-the-art that various modifications may be made without departing from the invention embodied herein — that is, those modifications to the apparatus or its mode of operation which are in the form of adjuncts and do not interfere with the described operation of the distributor plate nor alter the basic method of vapor interception of the falling streams or curtains of powdered materials. For instance, it is contemplated when employing the apparatus for the agglomeration of soluble coffee powders, for example, if additional wetting and/or heating of the agglomerates is required additional saturated steam can be supplied through supplementary nozzles such as two nozzles, one above and one below the trajectory of the agglomerated material at the point where the agglomerates leave the cabinet to enter the drying zone. The vertical projection of the supplementary steam from these nozzles would not be of sufficient force to disrupt the main trajectory of the agglomerates but would be ejected at low pressures and velocities sufficient only to further wet and heat the particles as they were urged into the drying zone by the force of the main jets of steam and by the draft created by operating the drier tower at a slightly negative pressure.

Another modification contemplated is that of operating the lower nozzle 51 with either warm air or an air/steam mixture. Since the relative amount of wetting of the particles to be agglomerated by the saturated steam from the lower nozzle is much less than that from the top nozzle, the use of this technique provides a means of controlling the bulk density of the agglomerated products as indicated by the results of test data accumulated on a prototype of the apparatus and described in Example IX below.

EXAMPLE IX

Use of Air/Steam Mixture For Agglomerating Soluble Coffee Particles

Tests were made to determine the effect of steam/air flow combinations on soluble coffee agglomerated product density. The equipment consisted of a slit-type distributor plate similar in design to that previously described in the specification. The top steam nozzle was employed for steam flow only, and the lower nozzle utilized for air and/or steam.

The soluble coffee particles distributed by the slits in the distributor plate were contacted and agglomerated by steam from the top nozzle. The agglomerates thus formed were further contacted and propelled into the drying zone by the fluid from the lower nozzle. Using this arrangement with different air/steam combinations, the flowing data were obtained:

TABLE 3.—EFFECT OF STEAM/AIR COMBINATIONS ON AGGLOMERATED SOLUBLE COFFEE PRODUCT PROPERTIRS

| | Top nozzle steam rate (lbs./hr.) | Bottom nozzle steam rate (lbs./hr.) | Total steam rate lbs./hr.) | Air rate (c.f.m.) | Agglomerated product rate (lbs./hr.) | Steam product ratio | Product properties | | |
|---|---|---|---|---|---|---|---|---|---|
| | | | | | | | Density (gm./cc.) | Color index | Percent $H_2O$ |
| Run: | | | | | | | | | |
| 1 | 490 | 300 | 790 | 0 | 800 | 0.90 | 0.205 | 19 | 3.6 |
| 2 | 520 | 0 | 520 | 200 | 810 | 0.64 | 0.196 | 21.5 | 3.3 |
| 3 | 520 | 255 | 775 | 200 | 870 | 0.89 | 0.202 | 21.0 | 3.7 |
| 4 | 520 | 300 | 820 | 200 | 860 | 0.95 | 0.215 | 19.5 | 3.7 |

The table shows that agglomerated coffee product density can be varied within a range of almost 0.02 grams/cc by use of the above techniques. Density is a particularly important variable to control in agglomeration processes because of subsequent packaging considerations. It allows compensation for changes in feed powder properties, materials handling effects, jar size, jar geometry, etc. At the same time, although product color and moisture are somewhat affected, these variables remain well within normal specifications.

An added advantage is noted in comparing Runs Nos. 1 and 3. Essentially, the same density product can be produced by either method, but the use of air in conjunction with steam (Run No. 3) results in 10 percent lower steam/product ratio. Thus, if drying capacity is limiting, approximately a 10 percent product capacity increase would result. If even lower densities are desired (Run No. 2), a 35 percent reduction in stem usage, and an approximate 35 percent production increase can be realized. By the same token, higher densities can be produced (Run No. 4) with no extra steam usage or higher moisture penalty per unit of product.

Other modifications to the operation of the apparatus which will become apparent to those skilled-in-the-art include the employment of a fine spray of concentrated coffee extract for introduction in the path of the agglomerates and vapor as they leave the agglomerator feed port assembly and enter the drying zone. The concentrated coffee extract can be envisioned as a binder for the particles being agglomerated and as a coating for those agglomerates already formed. A stronger, darker agglomerated soluble coffee product will result from this procedure.

Similarly, very finely milled coffee powder can be introduced into the vapor-agglomerate body as it passes into the drying tower. At this point the agglomerates are still sufficiently tacky for the fine powder so introduced to adhere to their surfaces and yield a light colored soluble coffee agglomerate powder having a non-uniformly speckled appearance.

Although considerable attention has been given to the agglomeration of particles of spray dried coffee in the above description, the apparatus of this invention and its operational principles are equally adaptable to the agglomeration of soluble coffee particles which have been dehydrated by either vacuum or atmospheric freeze drying method and to soluble coffee particles which have been chilled before being agglomerated.

Additionally, other edible materials such as mixtures of gelatinous, hydrophillic particles, (gelatin, pectin, algin, and other gums or colloids, for example,) with sugars can be processed in the apparatus of the invention to form agglomerates having improved appearance, dispersibility and solubility.

Also, other non-food products may equally lend themselves to agglomeration by the apparatus of the present invention. For example, fertilizers which normally have a high percentage of diluent in order to effect more uniform distribution of the fertilizer and easier handling by the average user lend themselves notably to this particular procedure. In addition, there are other arts where the agglomeration process of the present invention may be employed such as in the pharmaceutical industry wherein it is desirable to add diluents to the basic medicaments to alter their density or to put them in a more usable state.

In view of the above, it will be seen that the several objects of the invention are achieved and other advantageous results obtained. While the foregoing has illustrated and described what is now contemplated to be the best mode of carrying out the invention, it will be understood that other applications of the apparatus of the invention are possible and that other embodiments disclosed may be subjected to various changes, modifications, and substitutions without necessarily departing from the spirit of the invention.

What is claimed and desired to be secured by Letters Patent is:

1. Apparatus for the production of agglomerates from fine particles of solid material capable of being agglomerated by fusion prior to being dried in a drying zone which comprises;

A. means providing an agglomerating chamber which is substantially closed except for an opening communicating with a drying zone, B. means for distributing said fine particles for free fall within the chamber in the form of at least one spatially interrupted rectilinear stream, said means comprising;

1. a horizontally oriented distributor plate having at least one aperture in its otherwise continuous flat surface, 2. means for vibrating the distributor plate in a vertical direction with the amplitude of horizontal oscillation of the distributor plate constrained to less than about 50 percent of the vertical amplitude of oscillation, said means comprising;

a. a seismic-type base shock mounted to the top of the cabinet, b. a first vertical support assembly mounted and secured to the base, c. a plurality of leaf-spring members, each spring secured in cantilever fashion at one end to the first vertical support assembly and laterally extending parallel over a substantial area of the base, d. a second vertical support assembly secured to the other ends of said leaf springs, said second vertical support free to vertically oscillate in opposition to the biasing forces of the leaf springs, e. an open bottom elongated bucket secured in proximity of its upper end to the second vertical support in vertical orientation and with its lower portion freely extending through an aperture in the top of the cabinet to permit vertical reciprocating motion of the bucket with respect to the base and the cabinet, f. means for securing the distributor plate to the bottom of the open bottom bucket whereby the distributor plate restricts the bottom opening of the bucket, and g. means for vertically oscillating the second vertical support against the biasing forces of the cantilever laterally extending leaf springs, C. means including at least two jet nozzles positioned one above the other and oriented within the chamber to supply substantially saturated vapor in such direction and in jets of such spread and velocity to intercept the spatially interrupted rectilinear stream of fine particles, fuse said particles to form agglomerates and direct said agglomerates through the opening of the chamber into the drying zone.

2. The apparatus in accordance with claim 1 in which the distributor plate is constructed with a plurality of uniformly spaced rectangular apertures, said rectangular apertures oriented parallel to each other and parallel in the direction of the path of vapor supplied by the jet nozzles.

3. The apparatus in accordance with claim 2 in which the distributor plate is machined to form rectangular slits with beveled edges intersecting the upper surface of the distributor plate.

4. The apparatus in accordance with claim 1 in which the means for vertically oscillating the second vertical support is a rotating eccentric vibrator mounted to said second vertical support, said rotating eccentric having a horizontal axis of rotation normal to the horizontal extension of the leaf springs.

5. The apparatus in accordance with claim 1 in which the means for vertically oscillating the second vertical support is a vibrator having two counterrotating shafts with an eccentric weight attached to each shaft, said vibrator mounted to said second vertical support whereby the counterrotating eccentric weights resolve centrifugal forces into a single straight line vertical force.

6. The apparatus in accordance with claim 1 in which the rotating eccentric vibrator causes the distributor plate to oscillate vertically with a frequency ranging from about 3000 cycles per minute to about 4000 cycles per minute and with an amplitude ranging from about 0.025 inches to about 0.060 inches and the apparatus constrains the horizontal amplitude of vibration of the distributor plate to less than about 50 percent of the vertical vibration.

7. The apparatus in accordance with claim 1 in which the means for securing the distributor plate to the bottom of the bucket comprises;

a. a plurality of clamp members vertically movably mounted to move in unison in proximity of the bottom edge of the bucket, each of said clamp members having two inwardly laterally disposed shoulders oriented beneath and to the outside of the bottom opening of the bucket and spaced to receive the distributor plate for slideable fit between said shoulders,
b. pneumatic means for urging the clamps in unison in an upward direction whereby the lower shoulders of the clamps bear against the bottom surface of the distributor plate and urge the distributor plate tightly against the bucket bottom surface edges, and
c. pneumatic means for urging said clamps in unison in a downward direction whereby the bottom surface of the upper laterally disposed shoulders bear against the upper surface of the distributor plate in proximity of its edges to dislodge the distributor plate from the bottom surfaces of the bucket for slidable removal from between the shoulders of the clamps.

8. The apparatus in accordance with claim 1 further comprising two separate nozzles vertically oriented in proximity of the opening in the cabinet and positioned to eject vapor into the vapor-agglomerate zone as said vapor-agglomerate material is urged from the cabinet into the drying tower.

9. Apparatus for the production of agglomerates from fine particles of solid material capable of being agglomerated by fusion prior to being dried in a drying zone which comprises;

a. means providing an agglomerating chamber which is substantially closed except for an opening communicating with a drying zone,
b. a horizontally oriented distributor plate having at least one aperture in its otherwise continuous flat surface, said distributor plate located within the chamber,
c. means for vibrating the distributor plate in a vertical direction with the amplitude of horizontal oscillation of the distributor plate constrained to less than about 50 percent of the vertical amplitude of oscillation, whereby the fine particles are distributed for free fall within the chamber in the form of at least one spatially interrupted rectilinear stream,
d. means including at least two jet nozzles positioned one above the other and oriented within the chamber to supply substantially saturated vapor in such direction and in jets of such spread and velocity to intercept the spatially interrupted rectilinear stream of fine particles, fuse said particles to form agglomerates and direct said agglomerates through the opening of the chamber into the drying zone.

* * * * *